United States Patent [19]

Gill

[11] Patent Number: 4,872,696
[45] Date of Patent: Oct. 10, 1989

[54] REMOTE RELEASE SADDLE POST CLAMP

[76] Inventor: G. Herbert Gill, 206 Russell St., Winters, Yolo C., Calif. 95654

[21] Appl. No.: 199,422

[22] Filed: May 27, 1988

[51] Int. Cl.⁴ ............................................. B62K 3/14
[52] U.S. Cl. ................................. 280/281.1; 74/500.5; 74/501.5 R; 74/502.2; 248/230; 248/231.2; 280/287; 280/288.3; 297/195; 403/104; 403/373
[58] Field of Search ....................... 280/278, 281, 287; 297/195; 403/104, 373, 377; 74/489, 502.2, 500.5, 501.6, 501.5; 248/230, 231.2

[56] References Cited

U.S. PATENT DOCUMENTS

| 578,011 | 3/1897 | Fils et al. | 280/287 |
| 3,849,008 | 11/1974 | Boucher et al. | 297/195 |
| 3,861,740 | 1/1975 | Tajima et al. | 297/195 |
| 4,067,589 | 1/1978 | Hon | 280/287 |
| 4,120,512 | 10/1978 | Newlands | 297/195 |
| 4,580,835 | 4/1986 | Angell et al. | 297/195 |

FOREIGN PATENT DOCUMENTS 2824974 12/1979 Fed. Rep. of Germany ...... 280/287
2116128 9/1983 United Kingdom ................ 297/195

OTHER PUBLICATIONS

Bicycling Science, Frank R. Whitt, David Gordon Wilson, Mit Press, Cambridge, MA, 2nd Ed.

Primary Examiner—Charles A. Marmor
Assistant Examiner—Eric Culbreth

[57] ABSTRACT

This invention is a remotely actuated release clamp for a bicycle saddle post, conveniently operated by a lever adjacent to a handlebar grip. When released, the saddle may be conveniently raised by a spring lifter, and lowered by the rider's weight. The unit is lightweight, simple, grips the saddle post firmly and is operable by a small thumb lever at the handlebar grip.

No release of the rider's handlebar grip or contortions or shift of the riders body weight is required, hence the saddle height change can be safely made at high speed or without stopping his pedaling.

6 Claims, 2 Drawing Sheets

REMOTE RELEASE SADDLE POST CLAMP

This invention relates to clamping or unclamping a bicycle saddle post by a remote control from the handle bar grip.

This invention allows the rider to clamp or unclamp his saddle post so he can adjust the saddle height without removing either his hand from the handlebar or his eyes from the road; neither does he have to stop pedaling to do this.

These and other purposes of the invention will be understood when the following description is read with reference to the accompanying drawings.

HISTORY OF THE INVENTION

According to the book "Bicycle Science" by Frank Whit and David Wilson (MIT Press, Cambridge, MA.), The normal saddle height for a bicycle can be set by having the rider's heel just touch the pedal with the rider upright and his leg stretched. However for maximum power output, the saddle should be about 1.8 inches higher, and for maximum relaxation while pedaling, the saddle should be about 1.8 inches lower than the normal. When dismounting or stabilizing the cycle when stopped, the saddle should be as low as possible, so there is considerable benefit to being able to adjust the saddle height at any time in motion or stopped.

When racing or touring under timed conditions, it is also desirable that this change be made without dismounting or even stopping pedaling.

These consideration have resulted in several patents: U.S. Pat. No. 3,861,740 by Tajima et al in 1975 which discloses a hydraulic mechanism operated by a remote lever ont he handlebars. The saddle is raised by gas pressure over an oil reservoir, and is depressed by the rider's weight on the saddle. The device is fairly complicated, heavy and subject to oil leakage. Loss of the air pressure would totally disable the unit.

Another method is disclosed in U.S. Pat. No. 4,580,835 by Angell et al. 1986. A torsion spring is coupled between a boss on the top of the cycle frame and the saddle post so that the spring raises the post when it is unclamped and the rider is not on the seat. A quick release bolt using a cam actuating lever (item 20) replaces the usual clamp bolt at the top of the frame saddle downtube. When the lever is turned, the saddle post is released, and the saddle post is free to move. The embodiment works well, but the rider must release the grip of one hand on the handlebars, then reach six to eight inches below the saddle to operate the handle. This maneuver unbalances the rider, tends to change the steering, and he must stop pedaling to do it.

Said item 20 is not described in said Patent; it is a common product of commerce in the bicycle art.

In a critical situation as in a race, this maneuver can result in a spill or accident if not very carefully done, especially at high speed.

With my invention, the operating lever for the saddle post clamp can be mounted on the handlebar by the grip, so the rider does not have to remove his hand from the grip, nor his eyes from the road. With a firm grip of both hands on the handlebar, he can perform the saddle moving maneuver without even stopping his pedaling.

The device is also quite light, so it does not detract from the cycle performance.

DESCRIPTION OF THE INVENTION

Figure 1:
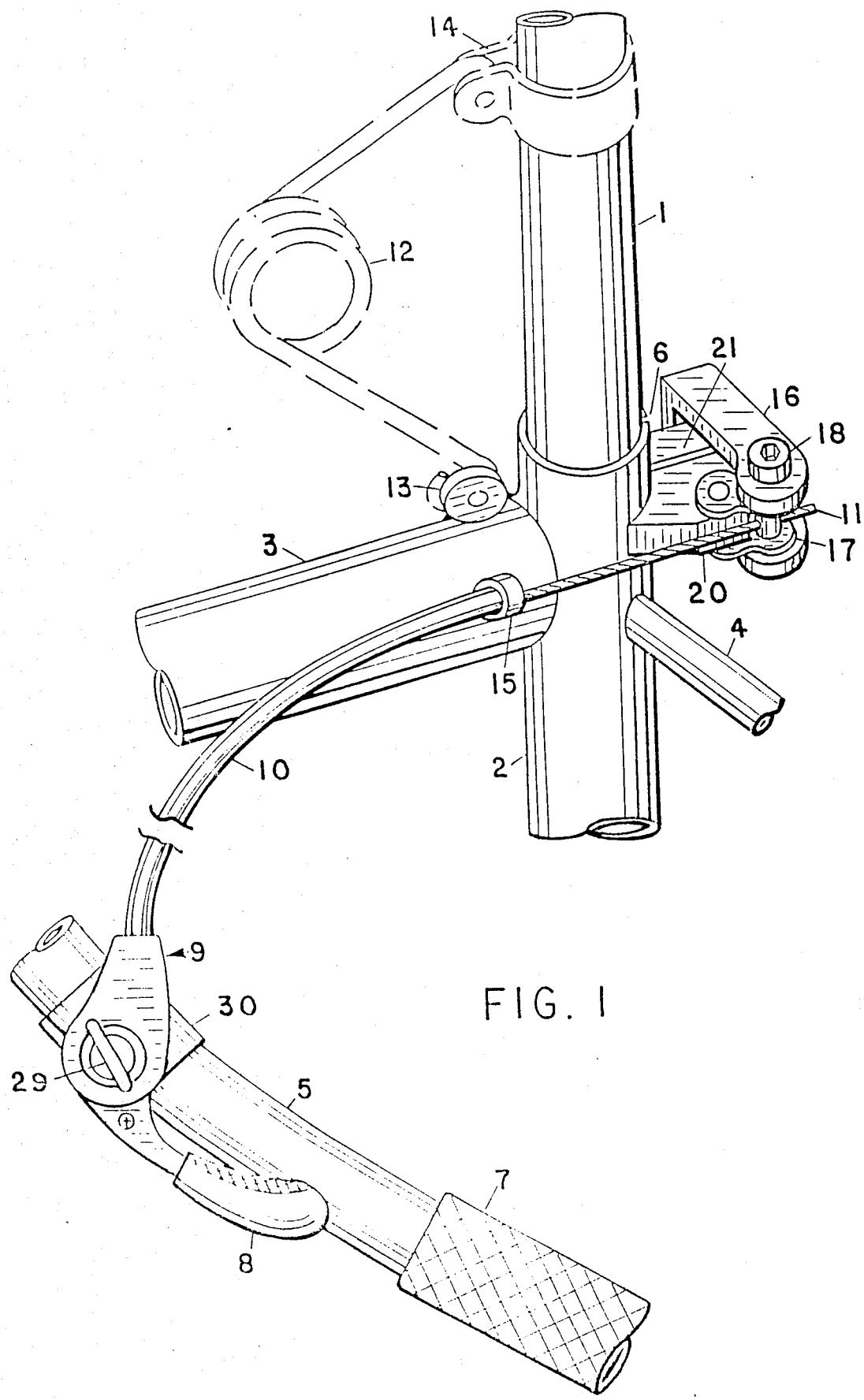
FIG. 1 is a general view of the invention as attached to a tytpical bicycle frame.
Figure 2:
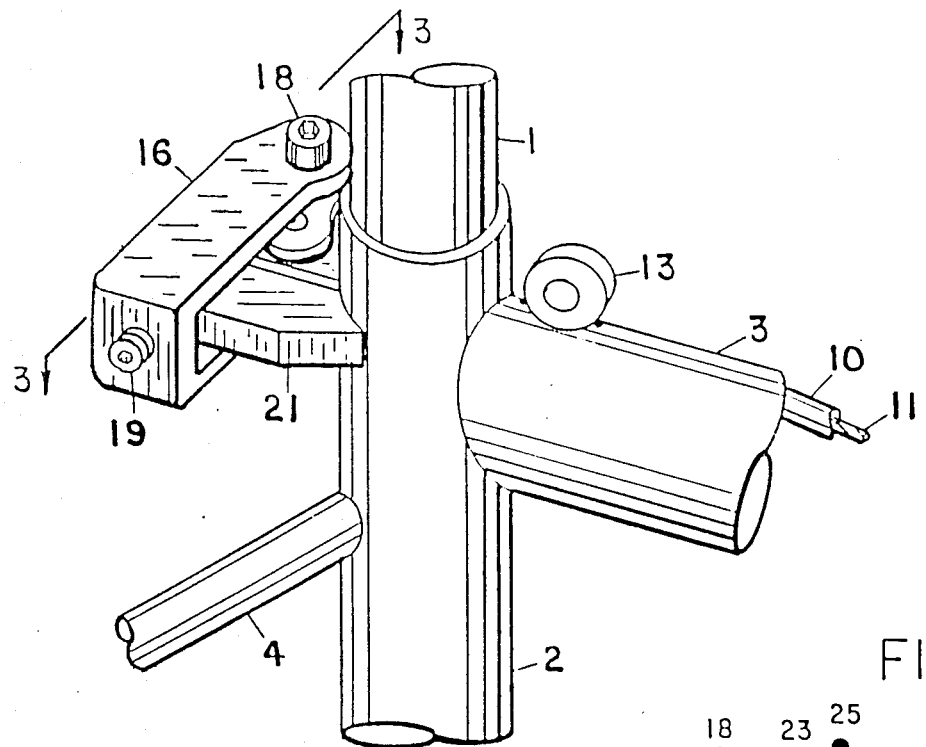
FIG. 2 is a detail view of the embodiment from the opposite side to FIG. 1.

Please refer first to FIG. 1. Item 1 is the moveable saddle post which slides inside of the frame saddle downtube 2. The horizontal frame tube is 3, and one of the backstays to the rear axle is 4. Item 5 is a portion of the handlebar on which is mounted the grip 7.

The construction of the frame at the intersection of items 2, 3 and 4 is normal to the art, with a slot 6 at the top of the rear of the said saddle frame downtube 2 which can be closed around the said saddle post 1 to lock it in position. Normally this closure means is a bolt, passing through two tubular bosses welded on opposite sides of said slot 6.

However in may invention, a different embodiment is used to effect this closure as will be described.

Not a part of this invention, but a benefit thereto is a boss 13 on top of said horizontal tube 3, to which is a spring 12 is mounted . Said spring at the other end is attached to the said saddle post 1 by a means such as an adjustable clamp 14. This embodiment is the subject of Angell's Patent.

On the handle bar 5, near the grip 7 is a mount 30 on which a thumb lever 8 is rotatably mounted. This lever operates a push pull cable 11 the outer sheath 10 of which is socketed in the anchor 15, which in turn is welded to said horizontal frame member 3. Said inner cable 11 is attached to a special pivot bolts 18 on the clamping mechanism. The internal mechanism within the housing 9 that moves the said cable 11 is not part of this invention. Item 29 is a variable friction adjusting knob for the thumb lever 8. Said mechanism 9, including the hand lever 8, the adjuster 29 and the mounting clamp 30 is a well known item of commerce as an operator of deraileur chain shifting mechanisms, a typical example being the Suntour "XC" Power Thumb Shifter".

Figure 3:
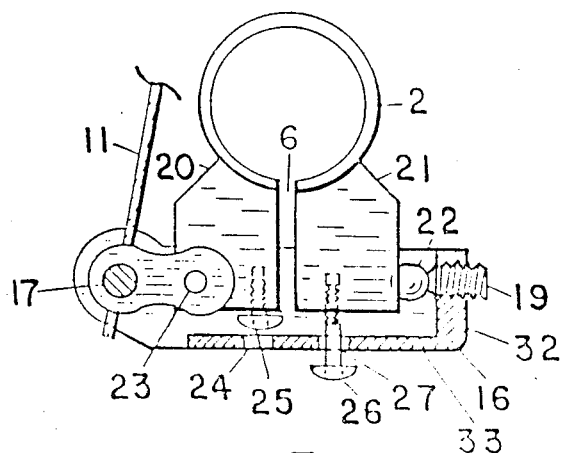
FIG. 3 is a sectional view of the embodiment with the top portion of the long lever removed for clarity.

Now please refer to FIG. 3 . My clamping mechanism consists of two essentially rectangular blocks 20 and 21 welded on each side of said slot 6 near the top of said downtube 2. Said slot 6 extends also between said blocks 20 and 21 as shown.

The left hand first block 20 has a short stop screw 25 threaded into the rearmost face and a hole in the outer leftmost corner through which freely passes a pin 23 that also goes through two short levers 17, one on top of and one below the said block 20. The pin does not pass through the long lever 16.

The right hand second block 21 has a long stop screw 26 threaded into its rearmost face, and a spherical pocket on the rightmost face which receives a spherical ball 22 partway.

Said long lever 16 is of a channel shape, with a partition 32 at the right end having a setscrew 19 threaded therein, said setscrew 19 having a cup shaped end partially enveloping said ball 22 opposite to said spherical pocket in block 21.

In a position and size to clear the bodies, but not the heads of stop screws 25 and 26 respectively, are holes 24 and 27 in the rearmost wall 33 of lever 16.

The leftmost end of said long lever 16 extends beyond said first block 20 sufficiently to permit said pivot bolt 18 to pass freely through the a hole in the lever itself then through holes in said short levers 17, thereby pivoting the long lever 16 and the two short levers 17 together.

The said short stop screw 25 has its head positioned between the block 20 and the inside of said rear wall 33 of lever 16, while the long stop screw 26 has it's head positioned outside of the said wall 33.

The said pivot bolt 18 has a hole through its body about midway of the griplength which accepts a cable 11, said cable 11 being clamped in said hole by any suitable means such as a clamping screw (not shown).

Please refer now to FIG. 1.

Said cable 11 enters a housing 10 at a point where the housing is held in an anchor 15 which is welded to the said frame tube 3.

Said housing 10 with the contained cable 11, extends up to one side of the handlebar 5, where it enters the body 9 of a hand lever actuator mechanism. Said body 9 is rigidly but adjustably mounted on the said handlebar 5, by the clamp 30 so the hand lever 8 is convenient to the handgrip 7.

Item 29 is said friction adjustment dial for the thumblever 8.

Item 12 is a torsion spring mounted on boss 13 which is welded to frame member 3, and to a clamp 14 surrounding the saddle post 1 by suitable fasteners (not shown).

OPERATION OF THE INVENTION

Figure 4A:
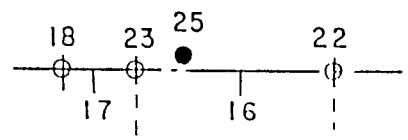
FIG. 4A shows the operating levers in the clamped position.
Figure 4B:
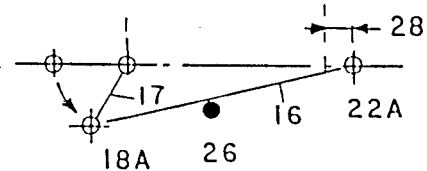
FIG. 4B shows the levers in the unclamped position.

Please refer first to FIG. 4A. In 4A, the position of the pivot points ( centers of the parts 18, 32 and 22 ) and the levers 16 and 17 are shown in the clamped position of the mechanism. In FIG. 4B, when the pivot point 18 is rotated counterclockwise to 18A, lever 17 rotates counterclockwise also. By this rotation, point 22 forced by the displacement of lever 16, moves to the right to position 22A, thus increasing the distance between points 23 and 22 by an amount 28.

Since pivot points 23 and 22 act on blocks 20 and 21 respectively, said blocks also change relative position by the amount 28 thus changing the width of said slot 6 both between the said blocks and said downtube 2.

In the unclamped position illustrated by by FIG. 4B, the said downtube 2 is undeflected, and said saddle post 1 can move freely up and down within the inner diameter of said downtube 2.

As pivot point 18A is moved clockwise back to point 18 of FIG. 4A, the distance between points 23 and 22 decreases, pulling said blocks 20 and 21 together, thus deflecting the wall of said downtube 2 as the slot 6 closes. Ultimately the downtube closes around and grips the saddle post 1.

The movement of lever 16 is limited in the clockwise direction by the short stop screw 25, and in the counterclockwise direction by the long stop screw 26.

The closure of said slot 6 is resisted by several forces: 1. Deflection of the wall of downtube 2 is a springlike action wherein the force is a function of the deflection of the tube wall. 2. The saddle post 1 must be gripped by a frictional force sufficient to prevent movement of said saddle post under the rider's weight plus acceleration loads. 3. Friction developed in all of the pivots during the closing movement.

Practically, the sum of these forces can reach 1500 to 2000 pounds during the closing movement. However in reopening, the deflection force 1 aids the opening, and the friction force 3 of the pivots is minimal, so the forces to unclamp are far lower. The clamping load between the saddle post 1 and the downtube 2 decreases almost instantly.

The force ratios of the lever system change very rapidly as the pivots approach alignment and displacements are very small. A long lever 16 made of alignment is nowhere near as satisfactory as a steel one because of the lower modulus of elasticity of the alignment: it deflects too much under load.

With proper materials and fits, it is possible to obtain operating forces on the pivot 18 as low as 0 to 5 pounds unclamping and 10–16 pounds clamping , well within practical operation by the thumb lever mechanism 9. The unclamping force is very dependent on the setting of the short stop screw 25, but the clamping force is primarily determined by the lever length ratio and low friction pivots ( Hard metals). The long stop screw 26 has little influence on the loads; it primarily limits the lever travel, hence the travel of the thumb lever 8.

The setscrew 19 in the long lever bulkhead 32 is used to adjust the clamping force between the deflected downtube 2 and the saddle post 1. With the lever system in position 4A, clamping, and short stop screw 24 set to have the point 18 slightly counterclockwise of the center line, setscrew 19 is tightened as desired to obtain adequate clamping force. Now the unclamping force on point 18 can be fine tuned by readjusting short stop screw 25. This adjustment is a balance between the allowable "Push" capability of the cable 11, the amount of friction load set into the thumb lever actuator 9, and the desires of the rider. The latch load is not adjustable; it is designed into the lever ratio.

Please refer again to FIG. 1. In the embodiment shown, the thumb lever assembly 9 is a readily available commercial product. It contains an adjustable friction mechanism which operates one way only to resist the outward movement of the cable (push) but contains a ratchet mechanism so there is no friction when the cable is pulled. The cable sheath 10 is also an incompressable type that when anchored at the outer end 15, aids in the "push" action of the cable 11.

It is possible however to operate my clamping mechanism with a simple pivoted lever of suitable proportions, with or without a friction drag element, although the presence of an adjustable friction element simplifies the adjustment of the clamp mechanism itself.

Other embodiments of the clamping mechanism are possible: for instance, the blocks 20 and 21 can be attached to a separate narrow band surrounding the top portion of the downtube 2, said band acting to squeeze the said top of said downtube to accomplish the clamping action.

Also, the blocks 20 and 21 can be shaped to enter the holes, or surround the conventional bolt bosses as conventionally used at the top of the downtube to accept a bolt for clamping purposes. Setscrew 19 and pivot point 22 may be one piece or a screw with a cup-shaped end and a ball.

Thus the reader can see that my invention serves as a lightweight, simple way of accomplishing a necessary function needed to adjust the bicycle saddle height without stopping or going through hazardous maneuvers while riding.

While the above description contains many specifics, these should not be construed as limitations on the scope of the invention, but rather as an example of one preferred embodiment thereof. Accordingly, the scope of the invention should be determined by the appended claims and their legal equivalents rather than the embodiments illustrated or described.

What I claim is:

1. A remotely operable clamp for a bicycle saddle post where the said saddle post is inserted into the top of an essentially vertical down tube comprising a portion of the frame of said bicycle,
   (a) said top of said downtube having a slot therein, parallel to the axis of said downtube,
   (b) a first and a second essentially rectangular block attached rigidly to the opposite sides of said slot near to the top of said downtube,
   (c) said blocks being perpendicular to said slot, and coplanar to each other,
   (d) two short levers having one end of each pivoted coaxially on the first of said blocks with the ends opposite to the pivots extending beyond the edge of said first block,
   (e) a long lever having one end pivoted on said second block, having two projections on the opposite end overlapping both of said extending ends of said short levers ,
   (f) a pivot bolt passing through said extending ends of both of said short levers, and through both of said projections of said long lever, whereby all said levers are rotatably connected together,
   (g) said pivot bolt having an operating means attached thereto approximately centered between the said two short levers, whereby movement of said operating means moves said pivot bolt rotationally in an arc about the said pivots of said short and said long levers,
   (h) a first stop to limit the rotational movement of said levers in one direction,
   (i) a second stop to limit the rotational movement of said levers in another direction,
   (j) said operating means being operatively connected to a hand lever located on said bicycle frame.

2. A remotely operable clamp whereby the slotted top of a bicycle frame downtube into which is inserted a saddle post is deflected to grasp said saddle post, comprising,
   (a) a first essentially rectangular block rigidly attached to one side of the slot in the top of the said bicycle saddle downtube,
   (b) a second essentially rectangular block rigidly attached to the opposite side of the said slot in said top of the said bicycle saddle downtube,
   (c) said first and second blocks being perpendicular to the said slot,and at the same distance from the said top of said down tube,
   (d) two short levers rotatably mounted with coaxial pivots on said first block,
   (e) a long lever pivoted on said second block,
   (f) said long lever having a form that overlaps both said short levers at the end opposite to said rotatable pivot of said short levers,
   (g) said overlap being outside of the edge of said first block,
   (h) said long lever having in said overlap a pivot bolt passing through said long lever and both said short levers whereby all of said levers are rotatably connected together,
   (i) said pivot bolt having an operating means attached perpendicularly to the midpoint between said short levers, whereby movement of the operating means moves the said cross bolt and rotates all said levers about their respective said pivots on said first and said second blocks,
   (j) said rotation of said levers being limited in both directions by stops,
   (k) said operating means being operationally connected to a hand lever located on said bicycle frame, whereby hand movement of said hand lever moves said pivot bolt to operate said clamp remotely.

3. The invention of claims 1 or 2 wherein,
   (a) the said pivot of said long lever on said second block consists of a spherically pointed screw threaded into an end of said long lever,
   (b) said screw engaging a hemispherical recess on the side of said second block.

4. The invention of claims 1 or 2 wherein,
   (a) the said pivot of said long lever consists of a ball resting in a cylindrical pocket on the side of said second block and,
   (b) a screw with a cupped point engaging said ball and being threaded into an end of said long lever.

5. The invention of claims 1 or 2 wherein,
   (a) said stops are adjustable screws threaded into either or both of said blocks,
   (c) the heads of said screws contacting surfaces on said long lever whereby the rotary movement in either direction of said lever is adjustably regulated.

6. The invention of claims 1 or 2 wherein,
   (a) said hand lever contains a means for adjustably adding friction to restrain movement of said lever and thereby the movement of said operating means connected thereto.

* * * * *